United States Patent

[11] 3,599,658

| [72] | Inventors | Harold F. Kruzan<br>Yorba Linda;<br>Dwight N. Johson, Anaheim, both of, Calif. |
|---|---|---|
| [21] | Appl. No. | 845,281 |
| [22] | Filed | July 28, 1969 |
| [45] | Patented | Aug. 17, 1971 |
| [73] | Assignee | American Meter Company<br>Philadelphia, Pa. |

[54] PRESSURE REGULATOR WITH INTERNAL RELIEF VALVE
7 Claims, 2 Drawing Figs.

[52] U.S. Cl. ................................................... 137/116.5,
        137/505.46
[51] Int. Cl. .................................................... G05d11/00,
        F16k 31/12
[50] Field of Search ............................................. 137/116.3,
        116.5, 505.46

[56] References Cited
UNITED STATES PATENTS

| 2,898,930 | 8/1959 | St. Clair et al. | 137/116.3 |
| 3,032,054 | 5/1962 | Irwin | 137/116.5 |
| 3,160,169 | 12/1964 | Peterson | 137/116.5 X |
| 3,386,465 | 6/1968 | Johnson | 137/505.46 X |
| 3,424,194 | 1/1969 | Kruzan et al. | 137/505.46 X |
| 3,488,685 | 1/1970 | Hughes | 137/116.5 |

FOREIGN PATENTS

| 535,545 | 11/1955 | Italy | 137/116.5 |

Primary Examiner—Laverne D. Geiger
Assistant Examiner—David J. Zobkiw
Attorney—Lyon and Lyon ABSTRACT: A pressure regulator has a flexible diaphragm connected through a pivoted lever to operate a main valve between an inlet and an outlet. The outlet communicates with a chamber below the diaphragm. The diaphragm has a central opening closed by a relief valve having a valve head engaging the diaphragm. The valve head has a central stem and a plurality of posts circumferentially spaced about the stem all projecting through apertures in the central portion of a diaphragm stiffener. The main load spring acts through an annular cup to apply a downward force to the posts and relief valve head to cause the lever to open the main valve. The annular cup engages a bonnet to limit upward overtravel of the relief valve head in event of failure of the lever or its connections. A relief valve spring encircling the stem within the load spring acts against the diaphragm stiffener so that the diaphragm moves upward away from the relief valve head against the force of the relief valve spring only, upon overpressure in the chamber when either the lever or the bonnet limits upward movement of the relief valve head. This construction separates the main load spring from the relief valve function, for closer control of relief pressure where higher outlet pressures are required. Adjustable means on the stem is provided to vary the force of the relief valve spring, and adjustable means in the bonnet is provided to vary the force of the load spring.

PATENTED AUG 17 1971   3,599,658

INVENTORS.
HAROLD F. KRUZAN
DWIGHT N. JOHNSON
BY
Lyon & Lyon
ATTORNEYS

PRESSURE REGULATOR WITH INTERNAL RELIEF VALVE

This invention relates to a gas pressure regulator having an internal relief valve. A device of this general type is disclosed in the Niesemann U.S. Pat. No. 2,306,746 granted Dec. 29, 1942. Such regulators employ a load spring acting against a flexible diaphragm in a direction to open a main valve, together with a separate relief valve assembly for closing an opening through the center of the diaphragm. Pressure in the chamber below the diaphragm is resisted by both the main load spring and the relief valve spring. This construction is satisfactory for many installations where the relief valve pressure setting is not too small in comparison to the outlet pressure required. However, when higher outlet pressures are required, together with close control on relief valve pressure, the disparity in spring rates of the load spring and relief valve spring becomes so great that it is difficult to maintain close control of relief valve pressure.

Regulator devices of this type commonly employ a pivoted lever transferring motion of the diaphragm to a movable element of the main valve assembly. Under normal operation, the lever limits upward movement of the relief valve head so that overpressure in the chamber below the diaphragm may lift the diaphragm away from the relief valve head to open the passage through the center of the diaphragm. In the event of failure of the lever or its pivotal support or its connections to the parts of the main valve and relief valve, the relief valve head would not be held down under an overpressure condition, with the result that the relief valve head would move up with the diaphragm and the relief valve would fail to open. To guard against this contingency, the device of the present invention employs means on the relief valve head which move into contact with the bonnet which clamps the diaphragm to the body. Such contact serves as a stop to limit upward overtravel of the relief valve head, so that overpressure in the chamber below the diaphragm may lift the diaphragm away from the valve head to open the relief valve.

Accordingly, it is the principal object of the present invention to provide an improved gas regulator construction which separates the main load spring from the relief valve function, for closer control of relief pressure where higher outlet pressures are required, and which device also provides a stop engaging the underside of the bonnet to limit upward overtravel of the relief valve head.

Other objects and advantages will appear hereinafter.

Figures 1, 2:
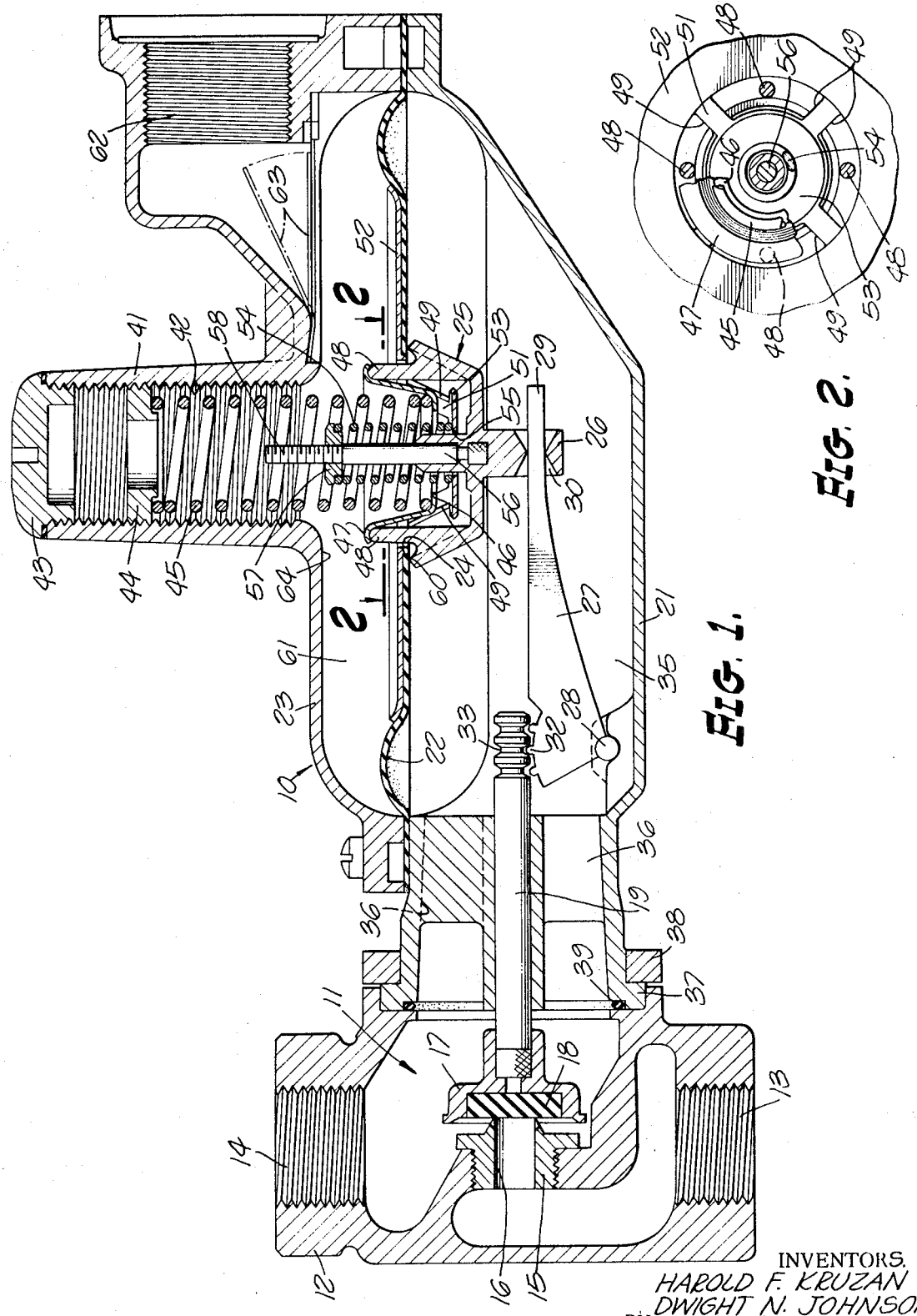
FIG. 1 is a transverse sectional elevation showing a preferred embodiment of this invention.
FIG. 2 is a section detail partly broken away, taken substantially on the line 2-2 as shown in FIG. 1.

Referring to the drawings, the pressure regulator generally designated 10 includes a main valve assembly 11 positioned in a housing 12. The housing 12 is provided with an inlet 13 and an outlet 14, and the main valve assembly 11 controls flow from the inlet 13 to the outlet 14. The stationary valve seat 15 is removably mounted on the housing 12 and is provided with a central orifice 16. A movable valve element 17 includes a nonmetallic disc 18 which engages the seat 15 to form a seal. The valve element 17 is fixed to a valve stem 19 slidably mounted in the body 21.

The outer periphery of a flexible diaphragm 22 is clamped between mating surfaces of the body 21 and the bonnet 23. The flexible diaphragm 22 is annular in shape and is provided with a central opening 24. A relief valve assembly generally designated 25 is mounted in this opening, and this assembly includes a relief valve head 26. A lever 27 pivotally supported on the body 21 at 28 has an extending portion 29 projecting through a slot 30 provided on the relief valve head 26. Gear teeth 32 on the lever 27 engage in annular grooves 33 on the stem 19, so that pivotal movement of the lever 27 causes corresponding reciprocating movement of the stem 19 and movable valve element 17.

The chamber 35 within the body 21 and below the flexible diaphragm 22 is connected to the outlet 14 through passages 36. The body 21 is connected to the housing 12 by means of mating circular flanges 37 and a clamp ring 38. Fasteners, not shown, serve to connect the clamp ring 38 to the housing 12. A seal ring 39 prevents leakage between the body 21 and the housing 12.

The bonnet 23 has a central upward projecting tubular portion 41 provided with internal threads 42 and closed by a threaded cap 43. An adjusting nut 44 engages the threads 42 and contacts the upper end of the load spring 45. This load spring 45 is a coil compression spring and the lower end thereof engages the shoulder 46 on the annular spring cup 47. This spring cup 47 comprises a portion of the relief valve assembly 25, and the upper end of the spring cup 47 rests on a plurality of posts 48 formed integrally with the relief valve head 26. Each of these posts 48 projects through an aperture 49 formed in the frustoconical central portion 51 of the diaphragm stiffener 52. This portion of the diaphragm stiffener 52 extends downward through the central opening 24 in the flexible diaphragm 22. The central end wall 53 of the stiffener 52 extends under the shoulder 46 to provide a support for the lower end of the relief valve spring 54. The end wall 53 has a central opening 55 through which a portion of the valve head 26 and integral stem 56 extend. The adjusting nut 57 engages the threaded portion 58 of the stem 56 and engages the upper end of the relief valve spring 54.

The rim 60 on the relief valve head 26 engages a portion of the undersurface of the flexible diaphragm 22 to form a seal. When the diaphragm 22 moves upward away from the valve head 26, as described below, gas may flow through the opening between the rim 60 and the underside of the diaphragm 22, through the apertures 49 and into the space 61 above the diaphragm and within the bonnet 23. Gas escapes from the space 61 to the vent connection 62 provided in the bonnet 23. If desired, a check valve 63 of the flexible flapper type may be employed which normally acts to prevent return flow from a vent connection 62 to the space 61, but which opens under very low differential pressure to vent space 61 through the vent connection 62.

The adjusting nut 44 may be turned by means of a tool, not shown, inserted into the tubular portion 41 of the bonnet 23, in the absence of the cap 43. Another tool, not shown, may be inserted through the central opening in the nut 44 for adjusting the nut 57 on the stem 56.

In normal operation, gas under pressure is admitted through the inlet 13 and passes through the outlet 14 at a pressure determined by the force of the load spring 45. When the pressure at the outlet 14 (and in the chamber 35) falls below a desired regulated downstream pressure, the spring 45 acting through the annular cup 47, posts 48 and valve head 26 moves the lever 27 about its pivot 28 in a clockwise direction, as viewed in FIG. 1. This causes movement of the stem 19 and movable valve element 17 toward the right, thereby permitting gas to flow from the inlet 13 through the orifice 16 and to the outlet 14.

If for any reason the pressure at the outlet 14 and in the chamber 35 should exceed the desired regulated pressure downstream, the pressure under the diaphragm 22 acts against the force of the load spring 45 to cause upward movement of the diaphragm 22 and valve head 26, until the lever 27 moves the valve element 17 to close the disc 18 against the valve seat 15, thereby closing the main valve 11. If leakage between the parts 15 and 18 should permit buildup of pressure at the outlet 14 and in the chamber 35, the end 29 of the lever 27 limits upward movement of the relief valve head 26 so that overpressure below the diaphragm 22 lifts it away from the rim 60 against the spring 54 to permit flow of pressure from the chamber 35 through the apertures 49, into the space 61 and past the flapper valve 63 to the vent connection 62.

In the event of failure of the lever 27 or its connection at 30 to the relief valve head 26, or its connection 32, 33 with the stem 19, overpressure in the chamber 35 below the diaphragm 22 lifts the relief valve head 26 with the diaphragm 22 and stiffener 52 until the annular cup 47 engages the surface 64 on the underside of the bonnet. This acts as a stop to limit further overtravel of the relief valve head 26 in the upward direction, so that pressure under the diaphragm 22 acts to move the diaphragm and stiffener 52 against the force of the relief valve spring 54, thereby venting the chamber 35 through the vent connection 62, as described.

We claim:

1. In a pressure regulator having a main valve assembly including a movable valve element for controlling flow between an inlet and an outlet, a body supporting said valve assembly, a bonnet having a vent opening, an annular flexible diaphragm having its outer periphery clamped between the bonnet and the body and defining a chamber within the body below the diaphragm, passage means connecting said chamber to said outlet, the diaphragm having a central opening, a pressure relief valve assembly positioned in said central opening and having a relief valve head, and a lever pivotally mounted on the body and operatively connected to said movable valve element and to said relief valve head, the improvement comprising, in combination: a load spring mounted in the bonnet, means for applying the force of the load spring against the relief valve head and thereby move the lever and movable valve element in a direction to open the main valve assembly, the latter said means including stop means on the relief valve head engageable with the bonnet to limit upward overtravel of the relief valve head, the relief valve head being engageable with the underside of the diaphragm adjacent its central opening to form a seal, a stiffener member overlying a portion of the diaphragm, the central portion of the stiffener member projecting downward through the central opening in the flexible diaphragm to provide a support, and a relief valve spring engaging the support on the stiffener member to apply a downward force thereto, whereby the diaphragm moves upward away from the relief valve head against the force of the relief valve spring only, to permit flow from said chamber through said vent opening upon overpressure in the chamber when either the lever or the bonnet limits upward movement of said relief valve head.

2. The combination of claim 1 in which adjustable means are provided on the bonnet for changing the force of the load spring.

3. The combination of claim 1 in which adjustable means are provided on the stem for changing the force of the relief valve spring.

4. In a pressure regulator having a main valve assembly including a movable valve element for controlling flow between an inlet and an outlet, a body supporting said valve assembly, a bonnet having a vent opening, an annular flexible diaphragm having its outer periphery clamped between the bonnet and the body and defining a chamber within the body below the diaphragm, passage means connecting said chamber to said outlet, the diaphragm having a central opening, a pressure relief valve assembly positioned in said central opening and having a valve head engageable with the underside of the diaphragm adjacent the central opening to form a seal, and a lever pivotally mounted on the body and operatively connected to said movable valve element and to said relief valve head, the improvement comprising, in combination: a central stem and a plurality of posts encircling the stem all fixed to the relief valve head and extending through the central opening in the diaphragm, a stiffener member overlying the diaphragm and having a central portion provided with apertures through which said stem and posts extend, an annular spring cup resting on said posts and encircling the stem, the spring cup engaging the bonnet to limit upward overtravel of the relief valve head, a load spring in said bonnet resting on the spring cup to apply a downward force to the relief valve head and thereby move the lever and movable valve element in a direction to open the main valve assembly, and a relief valve spring encircling said stem and engaging a portion of said stiffener member to apply a downward force thereto, whereby the diaphragm moves upward away from the relief valve head against the force of the relief valve spring only, to permit flow from said chamber through said vent opening upon overpressure in the chamber when either the lever or the bonnet limits upward movement of said relief valve head.

5. The combination of claim 4 in which the central portion of the stiffener member projects downward through the central opening in the flexible diaphragm to provide a support for the relief valve spring below the lower portion of said annular spring cup.

6. As a subcombination: an annular flexible diaphragm having a central opening, a relief valve assembly positioned in the central opening and having a valve head engageable with the underside of the diaphragm adjacent the central opening to form a seal, a stiffener member overlying a portion of the diaphragm and having a central portion extending through the diaphragm opening, said central portion having a plurality of apertures, and having an apertured end wall, a plurality of posts on the valve head projecting upward through said apertures and through the central opening of the diaphragm, an annular cup having an upper portion carried on said posts above the diaphragm and having a lower portion provided with a shoulder, a coil compression spring resting on said shoulder, a stem on the valve head projecting through the apertured end wall of said stiffener and through said annular cup, an abutment on the stem, and a second coil compression spring interposed between said abutment and the end wall of said stiffener and extending through said annular cup.

7. The combination of claim 6 wherein said abutment comprises a nut threaded on the stem.